United States Patent
Utsumi et al.

Patent Number: 5,259,886
Date of Patent: Nov. 9, 1993

[54] ROLLING MEMBER

[75] Inventors: Yasuo Utsumi, Fujisawa; Kousuke Nonaka, Fugisawa, Japan

[73] Assignee: Nippon Seiko Kabushiki Kaisha, Tokyo, Japan

[21] Appl. No.: 939,400

[22] Filed: Sep. 1, 1992

Related U.S. Application Data

[63] Continuation of Ser. No. 674,171, Mar. 21, 1991, abandoned.

[30] Foreign Application Priority Data

Mar. 22, 1990 [JP] Japan .................... 2-73116

[51] Int. Cl.$^5$ .............................. F16C 33/58
[52] U.S. Cl. ................... 148/318; 148/319; 148/320; 148/906; 384/912
[58] Field of Search ............ 148/319, 318, 320, 206, 148/207, 210, 906; 384/912

[56] References Cited

U.S. PATENT DOCUMENTS

| 4,060,290 | 11/1977 | Brawley | 308/216 |
| 4,191,599 | 3/1980 | Stickels et al. | 148/319 |
| 4,634,573 | 1/1987 | Yanagiya et al. | 148/319 |
| 4,696,581 | 9/1987 | Tsushima et al. | 384/565 |

FOREIGN PATENT DOCUMENTS

| 2-125838 | 5/1990 | Japan . |
| 2-125841 | 5/1990 | Japan . |
| 2-209452 | 8/1990 | Japan . |
| 279782 | 3/1928 | United Kingdom . |
| 935527 | 8/1963 | United Kingdom . |
| 1263710 | 2/1972 | United Kingdom . |
| 1266253 | 3/1972 | United Kingdom . |

Primary Examiner—R. Dean
Assistant Examiner—Sikyin Ip
Attorney, Agent, or Firm—Basile and Hanlon

[57] ABSTRACT

A rolling member used as an outer race, inner race, a ball or roller of a bearing contains a metal flow in the structure formed by plastic working (fold forging). The angle of metal flow determined by a tangent line of the metal flow and the axis of rotation of the rolling member is 10° or larger to improve the service line against rolling fatigue.

16 Claims, 4 Drawing Sheets

ROLLING MEMBER

This application is a continuation of application Ser. No. 07/674,171, filed on Mar. 21, 1991, now abandoned.

BACKGROUND OF THE INVENTION

1. Field of the Invention

The present invention relates to a rolling member and, in particular, to a rolling member of a rolling bearing used in a cylinder head, rocker arm, and the like of an engine for automobiles and auto-bicycles which is operated in a high engine speed range.

2. Description of the Art

Recently, there has been an increasing trend to change the bearing system of a cylinder head and a rocker arm of an engine for automobiles and auto-bicycles from a conventional slipper system to a rolling system to reduce friction of the engine and as a countermeasure for wear of the cam.

In this case, for an outer race of a rolling bearing, a conventional bearing steel type 2 (SUJ - 2) is used and the outer race was formed by turning a bar material and thereafter by hardening through quenching.

The rolling members which are used for such engines are required to provide high reliability and semipermanent service life from the standpoint of improving the safety and durability of the engines.

Accordingly, in order to meet such requirements, the Applicants of the present application proposed a long life rolling member in Japanese Patent Laid-Open Publication No. Hei 2-125,841, and Japanese Patent Laid-Open Publication No. Hei 2-209,452.

In such prior art rolling members, in order to reduce non-metallic inclusions which serve as a starting point of a crack at the time of plastic working, the cold forgeability is improved by reducing the content of S (sulfur) which is an element acting to produce the non-metallic inclusions and, at the same time, a long service life is attained.

Furthermore, a rolling bearing which provides longer service life has been proposed in Japanese Patent Laid-Open Publication No. Hei 2-125,838, in which the stress concentration is moderated to suppress the flanking due to fatigue by adding Nb (niobium) and V (Vanadium) and by forming fine crystal particles.

In engines for automobiles and auto-bicycles, since they are often operated at high engine speeds exceeding 10,000 revolutions per minute, the rolling bearing is also required to provide characteristics which enable it to withstand such severe operation.

However, in the prior art rolling bearing and rolling member, in a high engine speed region in which a phenomenon of jumping of the cam and the rocker arm exists, the follow of the rolling bearing to the rotation of the cam becomes unsatisfactory and a fatigue break (crack) of an outer race occasionally occurs. This fatigue break is caused by the presence of a non-metallic inclusion which acts as a starting point for a crack or fatigue break when a bending stress acting on the outer race becomes large. Accordingly, in order to achieve a long service life, it is necessary to reduce the fatigue break.

SUMMARY OF THE INVENTION

In order to solve the problems in the prior art, it is an object of the present invention to provide a rolling member which reduces the occurrence of a fatigue break as far as possible and, also, which achieves a long service life.

In one aspect of the present invention, in a rolling member which bears a load and rolls relative to a counterpart member, the angle of a metal flow formed by plastic working with respect to an axis of rotation is equal to or larger than 10 degrees.

In another aspect of the present invention, a rolling member is formed of an alloyed steel containing 15 ppm or less O (Oxygen) and 150 ppm or less S (sulfur) and at least the rolling surface is hardened by a heat treatment operation.

In another aspect of the present invention, a rolling member is formed of an alloyed steel containing 80 ppm or less Ti (titanium) and at least the rolling surface is hardened by a heat treatment operation.

In still another aspect of the present invention, a rolling member is formed by subjecting a case hardened steel to a carburizing treatment or a carbonitriding treatment and a residual stress due to compression is formed in a region from the rolling surface to a depth of 0.2 mm.

In manufacturing a rolling member, when an element which produces a non-metallic inclusion is used, the non-metallic inclusion is produced which becomes the cause of cracking. Accordingly, it is known to change the non-metallic inclusion into fine particles by plastic working (cold forging) and, at the same time, to make the material structure dense and uniform. By the plastic working, the non-metallic inclusion is changed to the fine particles and, also, extended uniformly. As a result, a flow (metal flow) of fiber of the non-metallic inclusion is formed.

The inventors of the present application discovered that in a rolling member which has been subjected to plastic working, when the angle of the metal flow with respect to the axis of rotation becomes 10 degrees or larger, a life versus rolling fatigue is significantly improved.

The present invention was made based on such a novel discovery and, in a rolling member which bears a load and rolls relative to a counterpart member, since the metal flow formed by plastic working forms an angle of 10 degrees or larger with respect to the axis of rotation, the non-metallic inclusion is made fine and the material structure is made dense and uniform. Furthermore, since the stress concentration acting on the non-metallic inclusion is moderated, a rolling member having an excellent wear resistance and an impact resistance can be achieved. Moreover, this rolling member provides a long life even when it is used in a high engine speed region in which a jumping phenomenon occurs.

DESCRIPTION OF THE PREFERRED EMBODIMENTS

Figure 1:
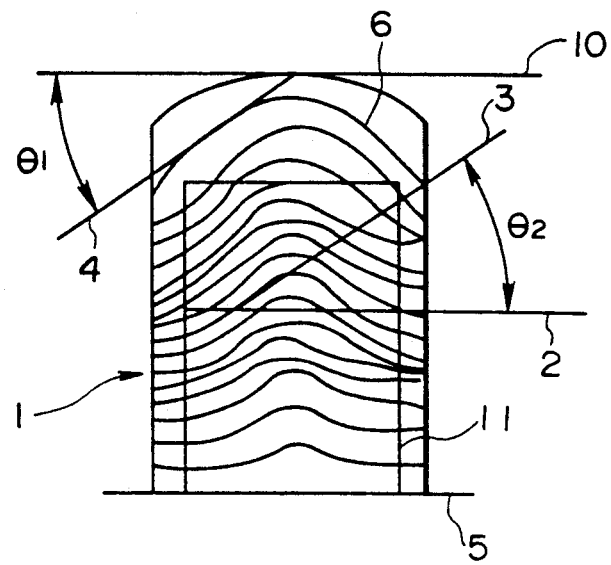
FIG. 1 is a cross sectional view showing a condition of metal flows in a ring-shaped test piece of a rolling member in one embodiment of the present invention.
Figure 2:
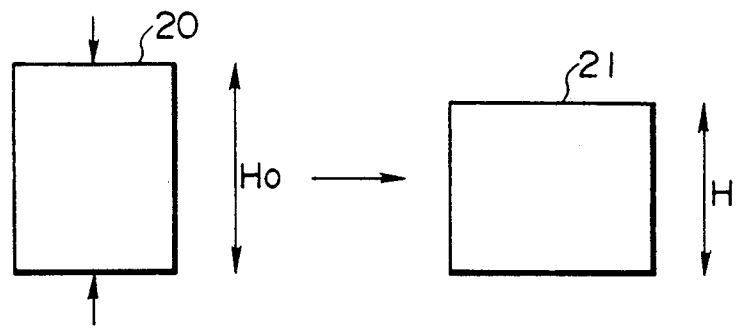
FIG. 2 is a schematic view for explaining swaging working.

FIG. 1 is a cross sectional view of a ring-shaped test piece 1 obtained by grinding a disk 21 into a ring shape, which disk 21 is obtained by cold forging a bar material 20 as shown in FIG. 2. Reference numbers 3 and 4 denote tangent lines of respective metal flows, reference number 5 denotes an axis of rotation of the test piece 1, and reference number 6 denotes a single metal flow.

The angle of the metal flow 6 is determined by the angle between the metal flow 6 and the axis of rotation 5 of the test piece 1. Accordingly, angles $\theta_1$ and $\theta_2$, respectively, between the tangent line 4 and a reference line 10 parallel to the axis of rotation 5 and between the tangent line 3 and a reference line 2 parallel to the axis of rotation 5 are angles of metal flow.

Figure 3:
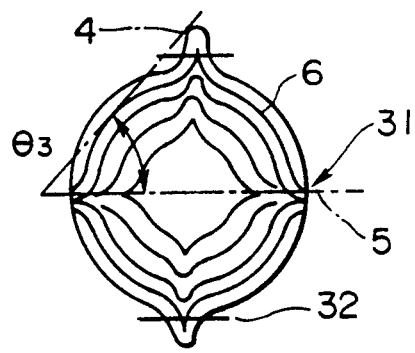
FIG. 3 is a cross sectional view showing a condition of metal flows in a steel ball which is a rolling member in another embodiment of the present invention.

In the case where the rolling member is a steel ball (rolling body) not of the ring shape, metal flows formed by plastic working are shown in FIG. 3 which is a cross sectional view of the steel ball. In FIG. 3, reference number 31 denotes a flow specific portion (end flow) at which the metal flow is exposed substantially perpendicular to a rolling surface, that is, a pole portion. Reference number 32 denotes an equator portion at which burrs are removed. The angle of metal flow in such a steel ball is defined similar to the case of the ring-shaped test piece mentioned above, that is, by an angle $\theta_3$ between a tangent line 4 and the axis of rotation 5.

As will be seen from FIGS. 1 and 3, since the metal flows curve towards a surface of the member, the angles between each metal flow and the axis of rotation assume various values. Hence, among these angles, an angle which assumes a maximum value is defined as the angle between the metal flow and the axis of rotation.

When the angle of metal flow mentioned above is less than 10 degrees, the non-metallic inclusions are not sufficiently changed to fine particles and the material structure does not become sufficiently dense or homogenized.

Figure 4:
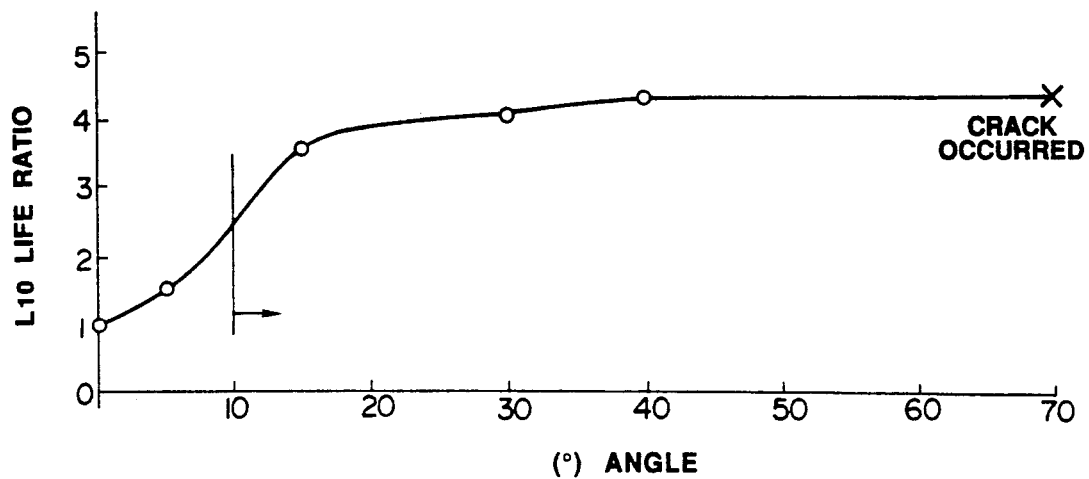
FIG. 4 is a characteristic chart showing a relationship between an angle of the metal flow and bearing life.

FIG. 4 shows a relationship between the angle of metal flow of test pieces and the life ($L_{10}$) ratio against a crack forming in a rolling member in which the test pieces are cold forged by changing the upset ratio (the upset ratio will be described later) at various rates in producing the ring-shaped test pieces using a conventional bearing steel Type 2 (SUJ - 2) and, in which, the life ratio of a standard which is not subjected to plastic working is made "1". In this case, as the angle of metal flow increases, the upset ratio also becomes high. As will be seen from FIG. 4, the life ($L_{10}$) is significantly improved when the angle of metal flow is equal to or greater than 10 degrees. The upper limit of the angle of metal flow is a working limit, that is, until a crack due to the plastic working is formed. In this respect, the occurrence of the crack varies depending on the conditions for producing the material. For example, when the material is subjected to spheroidizing annealing, the limit point of occurrence of the crack is improved to a high degree of working. Conversely, the limit is lowered as the concentration of carbon increases.

The rolling member in the present invention is obtained by plastic working of a material with an upset ratio in a range from a predetermined rate to a working limit (i.e., until the crack occurrence limit). Here, the upset ratio is expressed by $(H_o - H/H_o) \times 100\%$ in which, as shown in FIG. 2, $H_o$ represents the size of the material (bar material) before the plastic working (cold forging) and H represents the size of the material after the cold forging. As the upset ratio is increased, the angle of metal flow increases.

In obtaining the rolling member of the present invention, it is preferable that the upset ratio be in a range from about 10 to 60%. When the upset ratio is 10% or lower, there is a fear that the fiber angle of metal flow will become less than 10 degrees. On the other hand, when the upset ratio exceeds 60%, there is a fear that a crack will occur due to the working limit.

The fatigue break (crack) of a rolling member is caused by a crack which, in turn, is caused by a non-metallic inclusion located at the position of a maximum shearing stress. Accordingly, it is necessary, or even preferable, to perform plastic working so that the angle of metal flow at the position of the maximum shearing stress becomes equal to or greater than 10 degrees. In a rolling bearing, the position of the maximum shearing stress is located within several millimeters from the surface layer.

The angle of metal flow becomes a small value at a position near the core of the member and a large value at a position near the surface layer. Accordingly, in order to obtain a rolling member having a long life, it is preferable that the angle of metal flow at each position from the surface layer portion to at least the maximum shearing stress position is 10 degrees or larger.

Since the maximum shearing stress position is different depending on the applied load, it is preferable to determine the maximum shearing stress position from expected use conditions of the rolling member and to perform plastic working with an upset ratio to obtain a maximum value of the angle of metal flow which is equal to or grater than 10 degrees among the angles of metal flows formed between the surface of the rolling member and at least the maximum shearing stress position. By virtue of this, it is possible to obtain a rolling member in which the non-metallic inclusion at the maximum shearing stress position is made fine, the structure is made dense and uniform, and the service life is long.

The rolling members in the present invention include various kinds of rolling members such as an inner race and an outer race which constitute raceway rings, and a roller and a ball which constitute rolling bodies. As materials for forming the rolling member, a high carbon chrome bearing steel (SUJ 2-4), a carburized bearing steel (SCr 420H, SCM 420H, SNCM 220H, SNCM 420H, SNCM 815, SAE 4320), and a high temperature bearing high-speed steel (M50), which are known as bearing steels, and a rolling bearing stainless steel (SUS 440C, 51440C), and the like are employed.

In another aspect of the present invention, as a rolling member forming material, a high cleanness steel is used in which the contents of oxygen and sulfur which act as elements for producing the non-metallic inclusion are respectively selected, that is, 0.15 ppm or less, S : from about 30 pp to about 150 ppm, and Ti : from about 10 ppm to about 80 ppm. By the use of the high cleanness steel, the non-metallic inclusion which acts as a starting point for causing a fatigue break is limited as far as possible, and the life of the rolling member is further improved.

When the content of S (sulfur) is limited to 150 ppm or less, the production of a non-metallic inclusion (MnS, etc.), which is produced due to the action of S, is suppressed and the occurrence of a crack can be avoided at the time of plastic working. As a result, it becomes possible to perform the plastic working with a high upset ratio. Thus, the limitation of the content of S as mentioned above is preferred in order to achieve a fine-particled, non-metallic inclusion and a dense and fine material structure. In particular, the content of S is preferably 80 ppm or less.

Furthermore, a content of O (oxygen) equal to 15 ppm or less is preferable in suppressing the production of an oxygen family non-metallic inclusion ($Al_2O_{23}$) which has a coarse particle diameter and which acts as a starting point of the occurrence of a crack at the time of rolling fatigue. In particular, it is preferable that the content of O (oxygen) is equal to 9 ppm or less.

Furthermore, when the content of Ti (titanium) is limited to 80 ppm or less, it is possible to suppress the production of a nonmetallic inclusion (TiN) which is produced due to the action of Ti (titanium). In particular, it is preferable that the content of Ti (titanium) is equal to 40 ppm or less.

Figure 5:
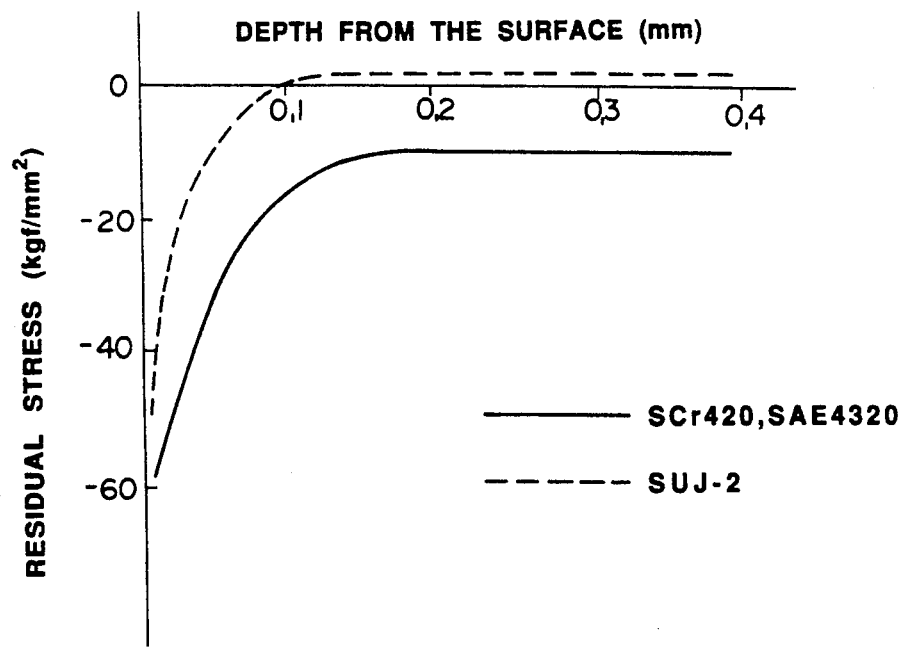
FIG. 5 is a characteristic chart showing a relationship between residual stress and distance from the surface of a rolling member.

As a material for a rolling member of the present invention, when a carburized bearing steel is used, the unbalance (the carbon concentration is higher at the surface layer portion) in the concentration of carbon is caused between a core portion and a surface layer portion as a result of carburization or carbonitriding. Thus, a residual stress of compression is formed from the surface layer portion through the core portion. Since the residual stress of compression acts to cancel out a stress due to rolling, the resistance for a rolling fatigue break is improved. The residual stress of a case hardened steel after carburization or carbonitriding increases, as shown in FIG. 5, at a position near the surface layer and decreases gradually from the surface layer to a depth of 0.2 mm. Thereafter, the residual stress is maintained substantially at a constant value. On the other hand, in the case of a normal hardened steel (SUJ - 2), the residual stress of compression exists within a depth of 0.1 mm; however, a certain amount of tensile stress is present at positions deeper than 0.1 mm. This tensile stress acts in a direction opposite to the direction of canceling the stress applied to the rolling member and there is a possibility that the position of maximum shearing stress is changed within several millimeters from the surface layer face.

Accordingly, in another aspect of the present invention, a case hardened steel is subjected to a carburizing treatment or a carbonitriding treatment so as to form a residual stress of compression from a rolling surface to a depth of 0.2 mm. As a result, the resistance to a rolling fatigue break is improved and a longer life is achieved. As the residual stress of compression, from the standpoint of improving the impact resistance and the wear resistance of the rolling member to thereby improve the life, it is preferable that the magnitude of the residual stress of compression is 10 kg/mm$^2$ or larger in a region from the surface layer portion to a depth of 0.2 mm. or more. In order to achieve this value of the residual stress of compression, it is necessary to adjust the concentration of a carbon source or a nitrogen source at the time of carburizing or carbonitriding and to adjust the carburizing or carbonitriding temperature and time.

EXAMPLE 1

A steel ingot of SUJ - 2 is produced by a 100 kgf vacuum furnace and, after subjecting the steel ingot to a red hearing treatment, the steel ingot is worked into a bar material 20 having a diameter of 22 mm. (FIG. 2). Then, the bar material 20 is cold forged with various upset ratios as shown in Table 1 (described later) and a disk 21 is produced as shown in FIG. 2. Thereafter, the disk 21 is cut into a ring shape as shown in FIG. 1 and, then, the disk 21 is subjected to a heat treatment and a grinding to produce a plurality of test pieces as shown in Table 1. In FIG. 1, the metal flows 6 are shown and a maximum value of the angles between the metal flows 6 and the axis of rotation 5 is defined as the angle ($\theta$) of metal flow. Furthermore, in FIG. 1, the solid line 11 represents a raceway groove of a rolling body.

The heat treatment includes spheroidizing tempering, quenching, and tempering. The spheroidizing tempering is performed by heating the steel to a temperature just above a transformation point and, after maintaining this temperature, the steel is gradually cooled at a suitable speed. The quenching is performed by oil cooling the steel after heating for suitable hours at 800° to 850° C, and the tempering is performed normally at a low temperature of 150° to 200° C.

Figure 6:
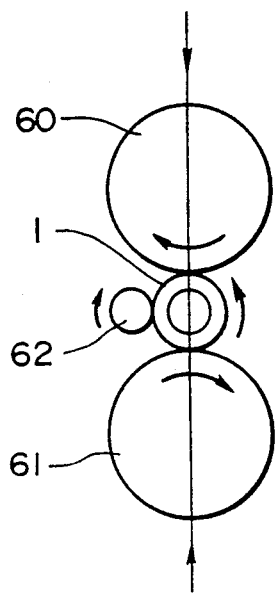
FIG. 6 is a schematic diagram showing an arrangement of a ring crack test machine for a bearing.

For each of the test pieces, a ring crack test was carried out in the manner shown in FIG. 6. Specifically, a test piece 1 is fixed between a load roll 60 and a drive roll 61 by using a support roll 62. A fatigue breaking test is carried out by applying a load to the test piece 1 by the load roll 60 and by rotating the test piece 1 at a high speed. In this case, a maximum test load is 500 kgf (a maximum acting stress of 118 kgf/mm$^2$) and the rotation speed of the test piece 1 is 9600 rpm. The life of the test piece 1 is determined by the number of rotations until a crack is caused from an inner peripheral surface. As the life, a 100% break life ($L_{10}$) is employed. Further, lubrication is performed by an oil mist lubrication of #68 turbine oil.

For each type of test piece, six pieces are prepared with the same upset ratio. Some of the six pieces are used in the fatigue breaking test and the rest of them are used as test pieces in obtaining an angle of metal flow. In the technique of detecting the angle of metal flow, a test piece is put into a treatment liquid containing water and concentrated hydrochloric acid in a predetermined ratio, that is, water:concentrated hydrochloric acid = 1:1, and boiled. This process is repeated a plurality of times, and the test pieces are observed by a scanning type atomic microscope. An angle ($\theta$) of metal flow is obtained from a photograph of a microscope image.

The results are shown in the following Table 1.

TABLE 1

| Test piece number | Upset ratio (%) | Metal flow angle | $L_{10}$ life (Cycle) | Life ratio |
|---|---|---|---|---|
| 1 | 0*1 | 0 | 0.13 × 10$^6$ | 1 |
| 2 | 10 | 5 | 0.20 × 10$^6$ | 1.5 |
| 3 | 20 | 15 | 0.46 × 10$^6$ | 3.5 |
| 4 | 30 | 30 | 0.52 × 10$^6$ | 4.0 |
| 5 | 35 | 40 | 0.56 × 10$^6$ | 4.3 |

TABLE 1-continued

| Test piece number | Upset ratio (%) | Metal flow angle | $L_{10}$ life (Cycle) | Life ratio |
|---|---|---|---|---|
| 6 | 60 | 50 | $0.57 \times 10^6$ | 4.4 |
| 7 | 70 | Crack occur | — | — |

*... only turning without conducting cold forging

As will be seen from Table 1, when the angle ($\theta$) of metal flow is increased to 10 degrees or more, the $L_{10}$ life is significantly improved. For example, when the angle ($\theta$) is 15 degrees, the life is about 3.5 times as long as the turned product (test piece number 1) which is not cold forged.

The upset ratio at the time cold forging can be increased to a working limit at which a crack occurs. As the upset ratio is increased, the angle of metal flow is increased resulting in a long life.

EXAMPLE 2

In this example, in order to examine the influence of cleanness of a material and a residual stress of compression on the life of a rolling member, as shown in Table 2, generally, two classes of test pieces are prepared so that in one class (high cleanness steel) the contents of O (oxygen), S (sulfur), and Ti (titanium) are high and, in the other class (low cleanness steel), the contents of O (oxygen), S (sulfur), and Ti (titanium) are low. Furthermore, each of the two classes are divided into two kinds, that is, in one kind, a residual stress by compression is present on the surface and, in the other kind, the residual stress is not present. The fatigue breaking test was conducted on these test pieces.

As materials for test, a bearing steel type 2 (SUJ - 2) for normal quenching and case hardened steels (Scr 420, SAE 4320) for carburizing, and carburizing and nitriding are used.

Figure 7:
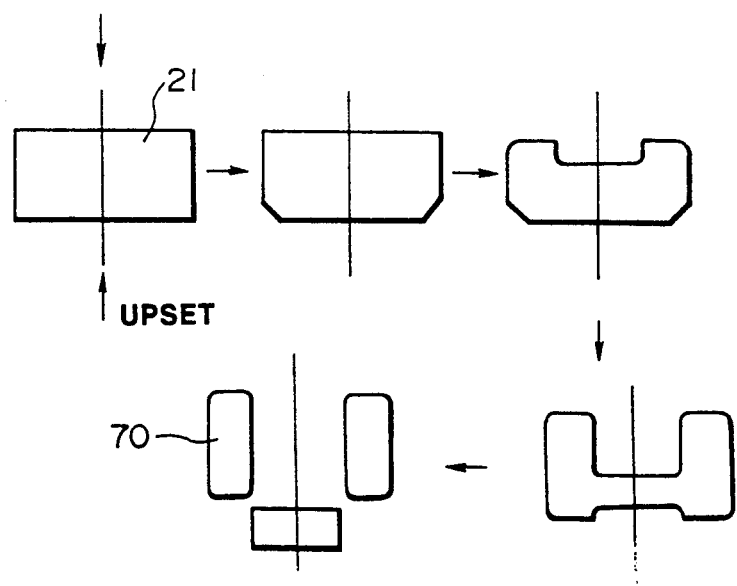
FIG. 7 is a schematic diagram for explaining five-stage header working.

A bar material 21 (a diameter of 22 mm.) of each material is cold forged into a disk 21 as shown in FIG. 2. Further, as shown in FIG. 7, the disk 21 is cold forged by a five-stage header to obtain a ring-shaped test piece 70. In this cold forging, the swaging rate is adjusted so that, for all the test pieces, the angle of fiber of metal flow after the forging equally becomes 15 degrees.

Figures 8A, 8B:
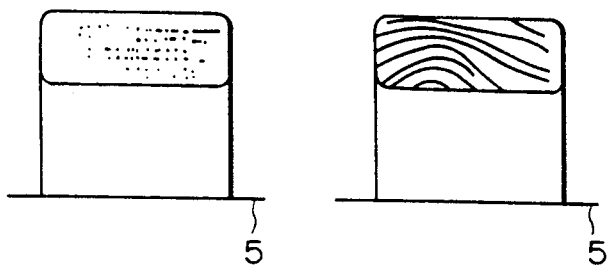
FIGS. 8A is a are cross sectional view showing a condition of metal flows in a ring-shaped test piece of a rolling member in another embodiment of the present invention.
FIG. 8B is a cross sectional view showing a condition of metal flows in a ring-shaped test piece of a rolling member formed by a five-stage header.

FIGS. 8A and 8B are views of half cross sections of ring-shaped test pieces used in this example. FIG. 8A shows a ring-shaped test piece obtained by directly turning the bar material 20 in FIG. 2 and FIG. 8B shows a ring-shaped test piece formed by the five-stage header. According to FIG. 8A, in the ring-shaped test piece formed only by turning, a metal flow is not clearly produced and, also, the angle of metal flow is seen as being parallel to the axis of rotation 5. In contrast, according to FIG. 8B, the metal flow is clearly produced and the angle of metal flow is large with respect to the axis of rotation 5.

The forged product is heat treated after turning and is subsequently cut to form a ring-shaped test piece. In the heat treatment, as to the SUJ -2, the quenching and annealing are performed similar to that in the above-mentioned EXAMPLE 1 and, as to the case hardened steel, the carburizing treatment is carried out. In this carburizing treatment, the case hardened steel is heat treated in an atmosphere of Rx gas plus 5% enriched gas for about eight hours at 930°±5° C. Thereafter, oil quenching is carried out and, furthermore, annealing is performed at 160° C. for two hours. In this respect, in place of the carburizing, carbonitriding may be carried out. However, in the latter case, a carbonitriding heat treatment is carried out in an atmosphere of Rx gas plus enriched gas plus 5% ammonia gas for about three to four hours at 830° to 870° C. Thereafter, oil quenching is carried out.

The residual stress by compression is defined by a minimum value of residual stresses by compression at positions 0.08 to 0.12 mm below the surface of the test piece.

In the following Table 2, the comparison example steel is test pieces which are directly formed by turning the bar material 20 in FIG. 2 without performing the cold forging by the five-stage header. Each of these test pieces corresponds to the one shown in FIG. 8A.

TABLE 2

| Test piece number | Method of working | Cleanness | Material | Content of O (ppm) | Content of S (wt %) | Content of Ti (ppm) | Residual stress (kgf/mm) |
|---|---|---|---|---|---|---|---|
| The present invention | | | | | | | |
| 8 | Cold forging | High cleanness steel | SUJ-2 | 8 | 0.006 | 14 | +5 |
| 9 | | | | 6 | 0.004 | 20 | |
| 10 | | | | 5 | 0.003 | 10 | |
| 11 | | | SCr420 | 7 | 0.008 | 14 | −20 |
| 12 | | | SAE4320 | 8 | 0.008 | 20 | |
| 13 | | Normal cleanness steel | SUJ-2 | 11 | 0.011 | 50 | +2 |
| 14 | | | | 10 | 0.011 | 42 | |
| 15 | | | | 14 | 0.012 | 40 | |
| 16 | | | SCr420 | 13 | 0.015 | 45 | −15 |
| 17 | | | SAE4320 | 13 | 0.014 | 50 | |
| Comparison example steel | | | | | | | |
| 18 | Turning | High cleanness steel | SUJ-2 | 4 | 0.002 | 10 | +1 |
| 19 | | | | 7 | 0.005 | 24 | |
| 20 | | | | 6 | 0.003 | 12 | |
| 21 | | | SCr420 | 9 | 0.008 | 18 | −16 |
| 22 | | | SAE4320 | 8 | 0.007 | 26 | |
| 23 | | Normal cleanness steel | SUJ-2 | 11 | 0.010 | 40 | +3 |
| 24 | | | | 13 | 0.010 | 38 | |
| 25 | | | | 13 | 0.011 | 48 | |
| 26 | | | SCr420 | 12 | 0.020 | 48 | −16 |
| 27 | | | SAE4320 | 14 | 0.017 | 46 | |

Figure 9:
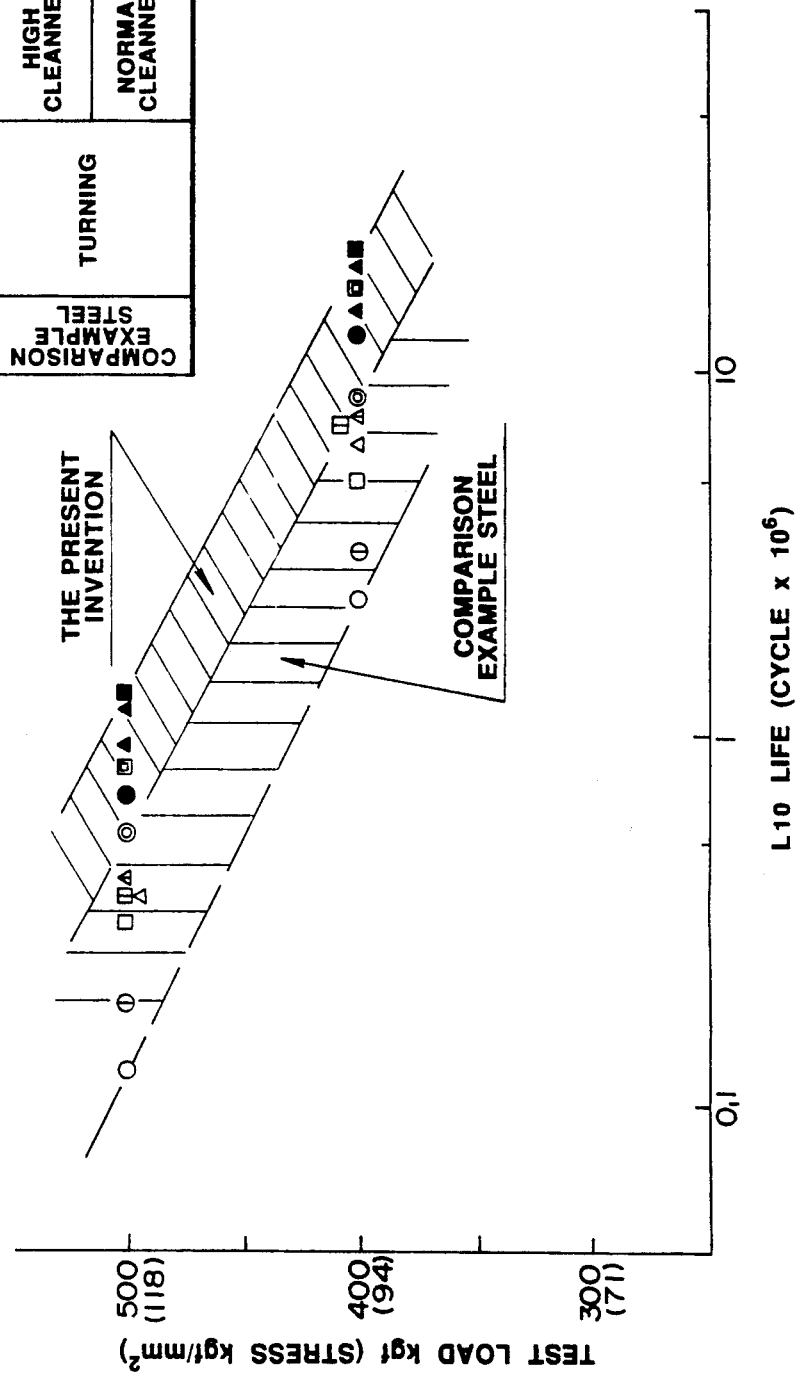
FIG. 9 is a characteristic chart showing a relationship between a test load and bearing life in another embodiment of the present invention.

For each of the test pieces shown in Table 2, the rolling fatigue test was conducted in the manner shown in FIG. 6. The test loads were divided into three grades of 350 kgf, 400 kgf and 500 kgf, and the number of test pieces for each grade is 10 test pieces for each of the 400 kgf and 500 kgf grades, and 3 test pieces for the 350 kgf grade. When the number of repetition times reached 100 ×10⁶, the test was interrupted. The test results are shown in FIG. 9.

As will be seen from the results, similar to EXAMPLE 1, it is confirmed that products formed by cold forging provide a longer life than the product formed by turning. Further, the high cleanness steel containing small contents of O (oxygen), S (sulfur), and Ti (titanium) provides a longer life as compared with the normal cleanness steel containing relatively greater contents of O (oxygen), S (sulfur), and Ti (titanium). For example, when comparing the cold forged product with the turned product, in the case of the high cleanness steel, the cold forged product is improved in the $L_{10}$ life to provide about six times as long a life as the turned product. In the case of the normal cleanness steel, the cold forged product is improved in $L_{10}$ life to provide about four times as long a life as the turned product. Furthermore, in the same cold forged product, for both the high cleanness steel and the normal cleanness steel, it is confirmed that the case hardened steel in which the stress by compression is present in the surface is longer in $L_{10}$ life than the quenched steel (SUJ - 2) in which the tensile stress is present only in the surface.

Although in the examples, as a rolling member which retains a residual stress by compression in the surface, it is described as to a case hardened steel which is subjected to a carburizing heat treatment, the present invention is not limited to this and a bearing steel other than the case hardened steel may be subjected to induction hardening.

While in the examples, the ring-shaped test pieces are tested, the same test results will be obtained for such test pieces as a roller and a steel ball which are rolling bodies.

The rolling member of the present invention is applicable to a raceway ring (inner race, outer race) and a rolling body (ball, roller).

As described in the foregoing, in the present invention, the following advantages are provided.

In one aspect of the invention, the angle of a metal flow formed by plastic working with respect to the axis of rotation is equal to or greater than 10 degrees. As a result, the non-metallic inclusion is made to become fine particles and the concentration of a stress acting on the non-metallic inclusion can be moderated. Accordingly, the structure can be made dense and uniform and a rolling member having a long life can be provided.

In another aspect of the invention, the contents of oxygen, sulfur, and titanium which are the elements acting as the cause of production of the non-metallic inclusion are reduced as far as possible. Accordingly, a rolling member having a further long life can be provided.

In another aspect of the invention, since the concentration of the stress is moderated by a residual stress by compression, a rolling member having a further long life can be provided.

What is claimed is:

1. A rolling member which is made of a steel and which bears a load and rolls relative to a counterpart member, the rolling member comprising:
   the rolling member having a fiber of a metal flow formed by plastic working of the rolling member extending continuously in the direction of an axis of rotation of the rolling member and an angle for the fiber of the metal flow in a plane containing and parallel with the axis of rotation of the rolling member being from a lower limit equal to or greater than 10 degrees to an upper limit equal to or smaller than 50 degrees with respect to the axis of rotation of the rolling member.

2. The rolling member according to claim 1 wherein the rolling member is formed by subjecting the rolling member to one of a carburizing treatment and a carbonitriding treatment, before being hardened.

3. The rolling member according to claim 1 wherein the rolling member has at least a rolling surface which is hardened by heat treatment.

4. The rolling member according to claim 2 wherein the angle for fiber of metal flow at each position from the surface layer portion to at least a maximum shearing stress position is from a lower limit equal to or greater than 10 degrees to an upper limit equal to or smaller than 50 degrees with respect to the axis of rotation of the rolling member.

5. The rolling member according to claim 3 wherein a residual stress by compression is retained in a region from a rolling surface to a depth of at least 0.2 mm of the rolling member.

6. The rolling member according to claim 1 further comprising:
   the steel further containing from about 30 ppm to about 150 ppm sulfur and from about 10 ppm to about 80 ppm titanium.

7. The rolling member according to claim 2 wherein a residual stress by compression is retained in a region from a rolling surface to a depth of at least 0.2 mm of the rolling member.

8. The rolling member according to claim 5 wherein the angle for fiber of metal flow at each position from the surface layer portion to at least a maximum shearing stress position is from a lower limit equal to or greater than 10 degrees to an upper limit equal to or smaller than 50 degrees with respect to the axis of rotation of the rolling member.

9. The rolling member according to claim 6 wherein the angle for fiber of metal flow at each position from the surface layer portion to at least a maximum shearing stress position is from a lower limit equal to or greater than 10 degrees to an upper limit equal to or smaller than 50 degrees with respect to the axis of rotation of the rolling member.

10. The rolling member according to claim 6 wherein at least the rolling surface of the rolling member is hardened by heat treatment.

11. The rolling member according to claim 6 wherein the rolling member is formed by subjecting the rolling member to one of a carburizing treatment and a carbonitriding treatment, before being hardened.

12. The rolling member according to claim 10 wherein the residual stress by compression is retained in a region from a rolling surface to a depth of at least 0.2 mm of the rolling member.

13. The rolling member according to claim 11 wherein the residual stress by compression is retained in a region from a rolling surface to a depth of at least 0.2 mm of the rolling member.

14. The rolling member according to claim 10 wherein the angle for fiber of metal flow at each position from the surface layer portion to at least a maximum shearing stress position is from a lower limit equal to or greater than 10 degrees to an upper limit equal to or smaller than 50 degrees with respect to the axis of rotation of the rolling member.

15. The rolling member according to claim 11 wherein the angle for fiber of metal flow at each position from the surface layer portion to at least a maximum shearing stress position is from a lower limit equal to or greater than 10 degrees to an upper limit equal to or smaller than 50 degrees with respect to the axis of rotation of the rolling member.

16. The rolling member according to claim 12 wherein the angle for fiber of metal flow at each position from the surface layer portion to at least a maximum shearing stress position is from a lower limit equal to or greater than 10 degrees to an upper limit equal to or smaller than 50 degrees with respect to the axis of rotation of the rolling member.

* * * * *